April 22, 1969  R. A. SCHUERCH  3,439,670
KNEE AND FETLOCK SUPPORT FOR ANIMALS
Filed Aug. 29, 1966  Sheet 1 of 2

INVENTOR.
RUSSELL A. SCHUERCH
BY
ATTORNEYS

April 22, 1969 R. A. SCHUERCH 3,439,670
KNEE AND FETLOCK SUPPORT FOR ANIMALS
Filed Aug. 29, 1966 Sheet 2 of 2

INVENTOR.
RUSSELL A. SCHUERCH
BY
*Kinney & Schenk*
ATTORNEYS

United States Patent Office 3,439,670
Patented Apr. 22, 1969

3,439,670
KNEE AND FETLOCK SUPPORT FOR ANIMALS
Russell A. Schuerch, 2316 Van Leunen,
Cincinnati, Ohio 45239
Filed Aug. 29, 1966, Ser. No. 575,883
Int. Cl. A61d 3/00; A61f 5/00
U.S. Cl. 128—80                                    1 Claim This invention relates generally to braces and supports and more particularly to a knee and fetlock support for animals.

In the past it has been the practice to treat weak or malformed fetlock joints of animals by means of a plaster cast which was applied directly to the joint by a veterinarian. The nature of a plaster cast is to become very hard and rigid and thereby hold the injured joint completely immobile. It is well known that limited and controlled exercise tends to strengthen a weak joint and complete immobility often contributes to the deterioration of the joint. Furthermore, the edges of such plaster casts have a tendency to cut into the animals leg, as a result of the pressure exerted on said edges. The casts in a short period of time also tend to crack, crumble and break away so that it becomes necessary to replace the cast at frequent intervals. Such practices were not only expensive but failed to produce the desired results and further were often painful to the animal, as evidenced by the cuts and scars.

It is therefore an object of the present invention to provide a fetlock support which may be readily applied to the weak or injured leg of an animal and in such a way that it gains its support from the portions of the leg adjacent the fetlock or knee joint and permits limited movement of the joint thus allowing exercise which promotes rapid healing and strengthening of the joint.

Still another object of the present invention is to provide a fetlock support which may be readily applied to the animal and which will be comfortable to wear and will in no way cut or injure the animal as all parts thereof in contact with the animal are constructed to prevent injury.

A further object of the present invention is to provide a knee support for animals wherein the knee joint may be held rigid and immobile against any movement whatsoever and as healing progresses resilient means may be added to the device to permit limited exercise and thereby promote healing and strengthening of the knee joint while still providing ample support for the animal to stand on the leg and thus exercise the leg.

A further object of the present invention is to provide a combination knee and fetlock support for animals which when applied to the leg of the animal will provide sufficient support for the animal to stand on the leg and have limited use of the joints thereby promoting the rapid healing and strengthening of the joints.

Another object of the present invention is to provide a knee and fetlock support for animals characterized by its structural simplicity, the easy assembly of its parts, its strong and sturdy nature and its low manufacturing cost. Other features of this invention reside in the arrangement and design of the parts for carrying out their appropriate functions.

Further objects of the present invention and certain practical advantages will be referred to in and will be evident from the following description of two embodiments of the invention, as illustrated in the accompanying drawings, in which.

Before describing in detail the herein disclosed embodiments of the invention, it is to be understood that the present invention is not limited to the structural details or the particular arrangement of parts herein shown, as devices embodying the present invention may take other forms. It also is to be understood that the phraseology and terminology herein used are for purposes of description and not of limitation, as the scope of the present invention is denoted by the appended claim.

Figure 1:
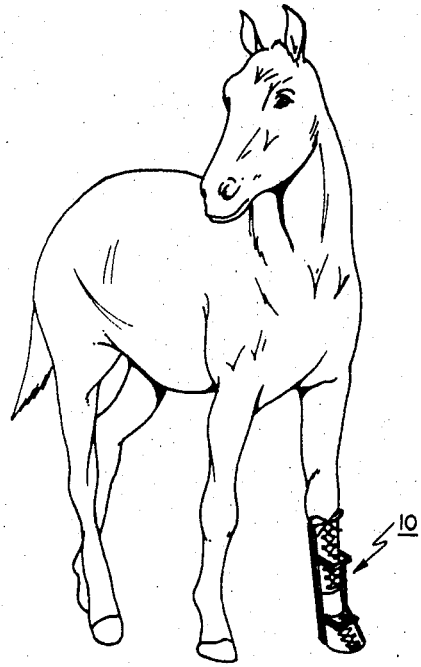
FIGURE 1 shows a horse with the present supporting device applied to one leg.
Figure 2:
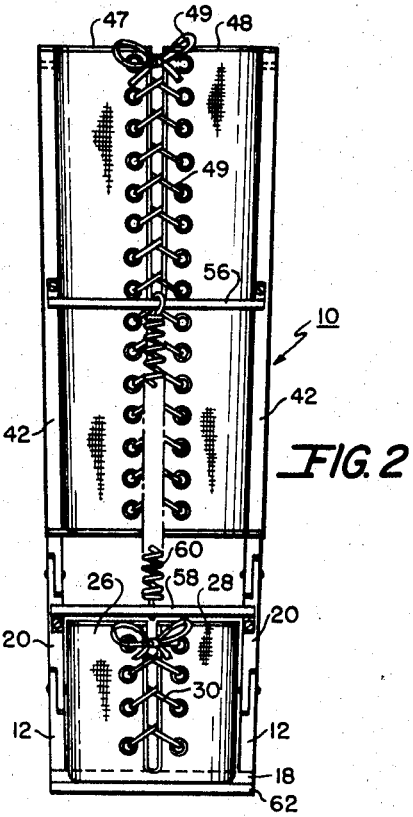
FIGURE 2 is a front elevational view of the fetlock support.
Figure 3:
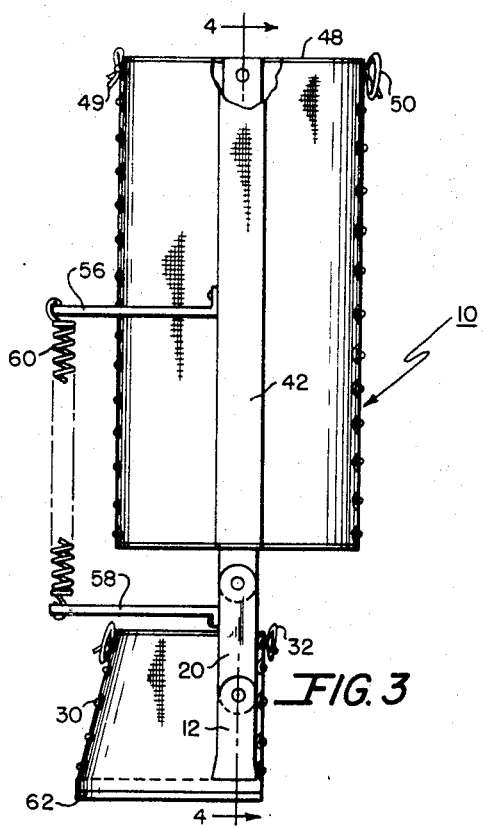
FIGURE 3 is a side elevational view of the fetlock support illustrated in FIGURE 1.
Figure 4:
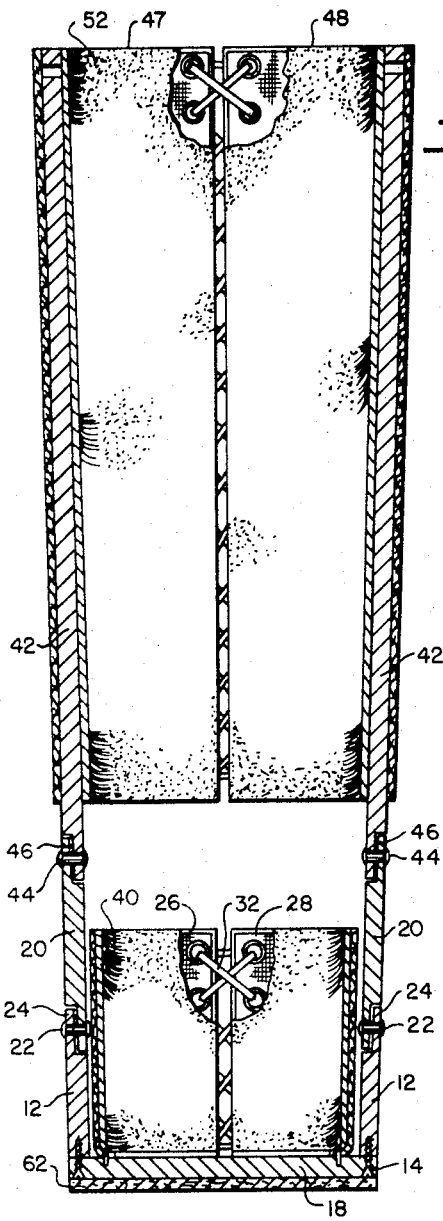
FIGURE 4 is an enlarged vertical sectional view taken along the plane of line 4—4 of FIGURE 3 and showing the details of construction of the fetlock support.

Referring now to FIGURES 2-4 the fetlock supporting device is shown generally at 10 and comprises spaced elongated side members each of which is constructed of a plurality of elongated sections longitudinally aligned and interconnected by suitable hinge means. A lower section 12 is secured by suitable screws 14 which project through elongated slots 16, to a bottom member 18. As seen in FIGURE 4 the screws 14 threadedly engage the lower ends of sections 12. The lower sections 12 are connected to intermediate sections 20 by means of pins 22. In order to provide smooth interior surfaces the sections 12 and 20 are provided with suitable steps or cut out portions at 24 which cooperate with each other to permit an overlapping of the sections 12 and 20 while still maintaining the outer and inner surfaces of said sections in alignment with each other. The pins 22 extend through said overlapping portions.

Means is provided for receiving and securely engaging the hoof of the animal. Said means take the form of a cup-shaped shoe constructed of two semi-circular sheaths of leather or other suitable material 26 and 28 which are secured to the bottom 18 by any suitable means and project upwardly between the spaced sections 12 and 20. The verical front and rear edges of the semi-circular sheaths are spaced from each other as seen in FIGURES 2 and 4 and are provided with suitable eyelets and front and rear lacings 30 and 32 respectively which are adapted to draw the shoe into tight engagement with the hoof of the animal. The sheath portions 26 and 28 are preferably lined with a heavy layer of sheep skin padding 40 over their entire inner surfaces so as to provide a cushion for engagement with the hoof of the animal. Preferably the hoof engaging shoe is shaped to conform generally to the contour of the animals hoof.

Upper sections 42 are provided and are pivotly connected by means of pins 44 and they are stepped or offset at 46 so that their inner and outer surfaces are continuous with the inner and outer surfaces of the intermediate and lower sections 12 and 20 respectively. The upper sections 42 are substantially longer than the intermediate and lower sections. The upper end of the upper sections 42 preferably terminate below the knee joint of the animal. A pair of semi-circular sheaths 47 and 48 preferably constructed of canvas, leather or any other suitable material, are secured about the upper sections 42 and are adapted to be rolled into a tubular form forming a circle or band around the leg portion of the animal above the fetlock joint and below the knee joint. The vertical edges at the front and rear of said sheaths 47 and 48 are provided with suitable eyelets which receive lacings 49 and 50 respectively. The inner surfaces of the sheaths 47 and 48 are also provided with a sheep skin lining 52 which may be laminated or in any other way secured to the inner surfaces of said sheaths. For added strength the sheaths 47 and 48 may completely encircle each of the upper sections 42, as seen in FIGURE 4, and may be secured against vertical slippage by suitable stitching, rivets or other suitable means.

It should be noted that the lower pins 22 are provided within the region of the hoof of the animal while the upper pins 44 between the intermediate and upper sections 20 and 42 respectively are provided adjacent the fetlock joint of the animal. A space is provided between the upper edge of the lower hoof-engaging shoe and the lower edge of the upper leg-engaging sheaths 47 and 48, in the region of the fetlock joint, so that the joint may be free to move and is in no way bound by supporting structure.

Means is provided to lend yielding resistance to the movement of the fetlock joint. Such means comprise a suitable U-shaped bracket 56 which is secured to and between the upper sections 42 by any suitable means and a lower U-shaped bracket 58 secured to and extending between the intermediate sections 20 below the center pivot 44. Suitable resilient means here illustrated by a coil spring 60 is conected between the spaced U-shaped brackets 56 and 58.

In use the device maintains the hoof of the animal in a normal walking position, with the spring offering yielding resistance to rearward bending of the fetlock joint. The side sections 12, 20 and 42 provide vertical support during the walking action of the animal. The resilient means may of course take other forms and I do not wish to limit myself to the precise means herein described.

The bottom member 18 is preferably constructed out of metal such as aluminum, steel or any other suitable material which is preferably light weight and is provided with a wearing sole 62 constructed of leather, plastic or other suitable wearing material.

In operation the hoof of the animal is inserted into the hoof-retaining shoe with the bottom of the hoof in contact with the bottom 18 and is securely retained therein by means of lacings 30 and 32. The leg portion above the fetlock joint and below the knee is encircled and securely engaged by the leg-engaging sheath portions 47 and 48 and retained by lacings 49 and 50. The vertical side members 12, 20 and 42 provide adequate support for the weakened or injured fetlock joint to permit the animal to stand and walk. The resilient means in addition to yieldingly resisting the bending of the fetlock joint force the animal to continuously overcome the tension in the spring during the walking operation whereby it gains strength and quickly recovers the complete use of the fetlock joint.

Figure 6:
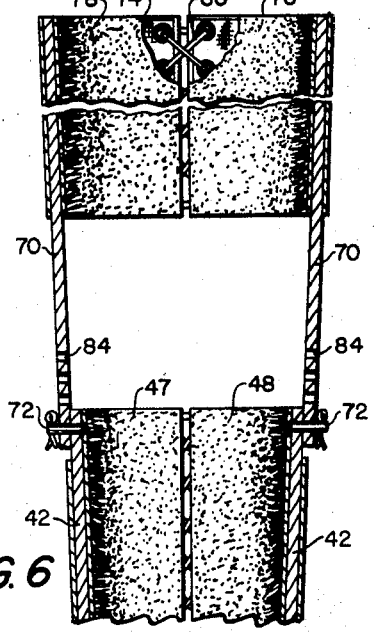
FIGURE 6 is an enlarged fragmentary view of another embodiment of the present invention illustrating a knee support for animals with parts shown in section and other parts broken away to more clearly illustrate the construction thereof.
Figure 7:
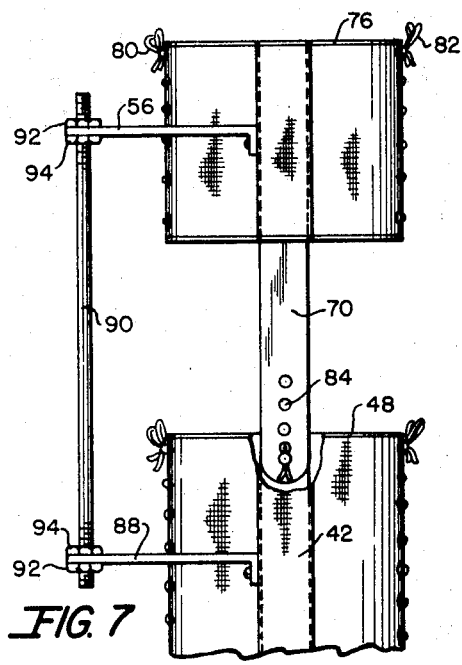
FIGURE 7 is a fragmentary side elevational view of the knee support shown in FIGURE 6.
Figure 5:
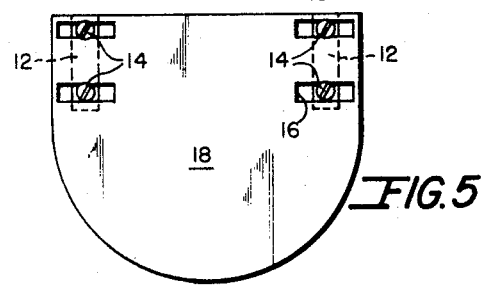
FIGURE 5 is a bottom plan view showing the means for permitting lateral adjustment of the side support members of the fetlock support.

In FIGURES 6 and 7 I have shown another embodiment of the present invention wherein means is provided for supporting the knee joint of an animal. Here a pair of spaced side members 70 are hingedly secured by means of pins 72 to the upper ends of sections 42 of the fetlock support device shown in FIGURES 1–5. A pair of cooperating semicircular sheaths 74 and 76 are secured to the upper portions of member 70 in the same manner as sheath portions 47 and 48 are secured to sections 42, heretofore described. Preferably such sheath portions are also provided with a sheepskin lining 78 and have their spaced front and rear vertical edges provided with suitable eyelets and lacings 80 and 82 respectively so that said portions may be rolled into a generally tubular form for encirclement around the leg portion of the animal above the knee joint. The lower edges of the sheaths 74 and 76 are preferably located above the knee joint so that an open space is provided for the knee joint between the upper edge of the sheath portions 47 and 48 and the lower edge of sheath portions 74 and 76, as clearly seen in FIGURES 6 and 7. Since the size of the knee joint of various animals will vary a plurality of spaced vertical aligned holes 84 are provided in the side members 70 to permit the sheath portions 74 and 76 to be moved toward or away from the sheath members 47 and 48, to thereby decrease or increase the size of the space between said sheath portions.

Means is provided for maintaining the knee joint in a rigid position. Such means comprise a U-shaped bracket 86, which is secured to members 70 in the region of the upper sheath portions above the knee joint and a second U-shape bracket 88 secured to the section members 42 below the knee joint. A rigid non-yielding rod member 90 is shown secured between the U-shape brackets by a pair of suitable cooperating retaining nuts 92 and 94 provided at each end thereof. The brackets 86 and 88 including the rod member 90 are designed to be located to the front of the device and thus prevent the knee from bending. As the knee joint heals and becomes stronger, the rigid rod member 90 may be replaced by suitable resilient means as heretofore described in connection with FIGURES 2 and 3 which yields to permit limited movement of the joint.

In view of the foregoing description, taken in conjunction with the accompanying drawings, it is believed that a clear understanding of the construction, operation and advantages of the device will be quite apparent to those skilled in the art.

Having thus described my invention and illustrated its use what I claim as new and desire to secure by Letters Patent is:

1. A fetlock support for animals comprising spaced elongated side members, said side members comprising a lower section, an intermediate section and an upper section, a bottom member secured to the ends of said lower sections, securing means on said bottom member adapted to securely engage the hoof of the animal, tubular sheath means secured to said upper sections for encirclement around the leg of said animal above the fetlock joint, means hingedly connecting said intermediate and lower sections in the region of said hoof, hinge means pivotly connecting said intermediate and upper sections in the region of said fetlock joint, said hoof engaging means and said leg engaging means being spaced apart in the region of the said fetlock joint, resilient means connected between said upper section and intermediate sections to yieldingly resist movement of said fetlock joint, upper side members hingedly secured to said upper sections and projecting vertically upwardly therefrom, upper sheath means of generally tubular form adapted for encirclement around the leg above the knee joint rigidly secured between said upper side members, means on said upper side members for axially adjusting said upper sheath means, adjustable means on said upper sheath means for tightly securing said upper sheath means to the leg of the animal and stiffening means connected between the upper members and said upper sections to resist movement of said knee joint, said stiffening means including a pair of spaced brackets secured to said upper side members and said upper sections and a rod secured between said brackets lying forwardly of said side members to resist movement of said knee joint.

References Cited

UNITED STATES PATENTS

| 950,232 | 2/1910 | Kupfer | 119—127 |
|---|---|---|---|
| 1,072,369 | 9/1913 | Spahn | 128—80 |
| 2,632,440 | 3/1953 | Hauser | 128—80 |

RICHARD A. GAUDET, *Primary Examiner.*

JOHN YASKO, *Assistant Examiner.*

U.S. Cl. X.R.

119—29